(12) United States Patent
Narasimhan et al.

(10) Patent No.: US 11,102,109 B1
(45) Date of Patent: Aug. 24, 2021

(54) SWITCHING A SERVICE PATH OVER TO AN ALTERNATIVE SERVICE PATH

(71) Applicant: Ciena Corporation, Hanover, MD (US)

(72) Inventors: Ashwath Narasimhan, San Jose, CA (US); Himanshu Shah, Hopkinton, MA (US); Arif Aboobacker, San Jose, CA (US); Divya Bhargava, Sunnyvale, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/789,559

(22) Filed: Feb. 13, 2020

(51) Int. Cl.
| | |
|---|---|
| *H04L 12/703* | (2013.01) |
| *H04L 12/707* | (2013.01) |
| *H04L 12/24* | (2006.01) |
| *H04L 12/733* | (2013.01) |
| *H04L 12/46* | (2006.01) |
| *H04L 12/723* | (2013.01) |

(52) U.S. Cl.
CPC .......... *H04L 45/28* (2013.01); *H04L 12/4633* (2013.01); *H04L 41/0627* (2013.01); *H04L 45/20* (2013.01); *H04L 45/22* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 8,259,590 B2 | 9/2012 | Shah et al. | |
| 8,295,278 B2 | 10/2012 | Shah et al. | |
| 8,948,055 B2 | 2/2015 | Bragg | |
| 9,094,337 B2 | 7/2015 | Bragg et al. | |
| 9,667,559 B2 | 5/2017 | Bhattacharya | |
| 2005/0013241 A1* | 1/2005 | Beller | H04J 3/085 370/216 |
| 2016/0380886 A1 | 12/2016 | Blair et al. | |
| 2021/0091973 A1* | 3/2021 | Gwun | H04L 12/437 |
| 2021/0092041 A1* | 3/2021 | Eckert | H04L 45/24 |

OTHER PUBLICATIONS

Author Unknown, Segment Routing Configuration Guide, Jan. 16, 2019, pp. 1-16 (Year: 2019).*

(Continued)

*Primary Examiner* — Christopher M Crutchfield
(74) *Attorney, Agent, or Firm* — Clements Bernard Walker; Lawrence A. Baratta, Jr.; Christopher L. Bernard

(57) ABSTRACT

Systems and methods for inducing a recovery of a service along a shorter path are provided. In one embodiment, a system having a processing device and a memory device is disclosed. The memory device is configured to store software logic including instruction that, when executed, enable the processing device to determine there is a defect in a primary Segment Routing (SR) to a main destination. The instructions further enable the processing device to identify an available path to an alternative destination that is shorter than a backup SR path to the main destination. Also, a main service associated with the main destination is switched over to an alternative service associated with the alternative destination based on the determining and the identifying.

20 Claims, 9 Drawing Sheets

(56) References Cited

OTHER PUBLICATIONS

Author Unknown, Fast Reroute with Segment Routing, as retrieved using the internet archive, www.archive.org, Mar. 15, 2018, pp. 1-18 (Year: 2018).*
A. Bashandy, C. Filsfils, Bruno Decraene, Stephane Litkowski, Pierre Francois, D. Voyer, Francois Clad, Pablo Camarillo, Topology Independent Fast Reroute using Segment Routing Oct. 4, 2018, pp. 1-19 (Year: 2018).*
Z. Hu, G. Yan, J. Yao, Segment Routing interworking with RSVP-TE, pp. 1-9 Jun. 30, 2018 (Year: 2018).*
S. Litkowski, C. Filsfils, B. Decraene, P. Francois, D. Voyer, F. Clad and P. Camarillo, Topology Independent Fast Reroute using Segment Routing, Jan. 18, 2020, pp. 1-24 (Year: 2020).*
Y. Shen, M. Jeyananth, B. Decraene, H. Gredler, C. Michel, MPLS Egress Protection Framework, pp. 1-25, Dec. 2019 (Year: 2019).*
C. Filsfils et al., Segment Routing Architecture, Internet Engineering Task Force (IETF), Standard Track, ISSN. 2070-1721, Jul. 2018, pp. 1-28.

* cited by examiner

110

| L2 Header (with VLAN optional) | | | | Remarks |
|---|---|---|---|---|
| SR tunnel label | TC | S=0 | TTL = 2 | |
| Label = 1 | TC | S=0 | TTL | Router Alert (optional) |
| PW label | TC | S=0 | TTL = 2 | |
| Label = 13 | TC | S=1 | TTL | GAL header (optional) |
| 0001 | Ver=0000 | Reserved | Channel Type = 0x7 | GACH (optional) |
| BFD | | | | |

112 — SR tunnel label row area
114 — lower portion

| L2 Header (with VLAN optional) | | | | Remarks |
|---|---|---|---|---|
| SR backup tunnel label | TC | S=0 | TTL = 2 | |
| Label = 1 | TC | S=0 | TTL | Router Alert (optional) |
| PW label | TC | S=0 | TTL = 2 | |
| Label = 13 | TC | S=1 | TTL | GAL header (optional) |
| 0001 | Ver=0000 | Reserved | Channel Type = 0x7 | GACH (optional) |
| BFD | | | | |

118 — upper portion
116 — lower portion

| L2 Header (with VLAN optional) | | | | Remarks |
|---|---|---|---|---|
| SR tunnel label | TC | S=0 | TTL = 3 | |
| Label = 1 | TC | S=0 | TTL | Router Alert (optional) |
| PW label | TC | S=0 | TTL = 3 | |
| Label = 13 | TC | S=1 | TTL | GAL header (optional) |
| 0001 | Ver=0000 | Reserved | Channel Type = 0x7 | GACH (optional) |
| BFD | | | | |

| L2 Header (with VLAN optional) | | | | Remarks |
|---|---|---|---|---|
| SR backup tunnel label 1 | TC | S=0 | TTL = 3 | |
| SR backup tunnel label 2 | TC | S=0 | TTL | |
| Label = 1 | TC | S=0 | TTL | Router Alert (optional) |
| PW label | TC | S=0 | TTL = 3 | |
| Label = 13 | TC | S=1 | TTL | GAL header (optional) |
| 0001 | Ver=0000 | Reserved | Channel Type = 0x7 | GACH (optional) |
| BFD | | | | |

| L2 Header (with VLAN optional) | | | | Remarks |
|---|---|---|---|---|
| SR backup tunnel label 2 | TC | S=0 | TTL = 1 | |
| Label = 1 | TC | S=0 | TTL | Router Alert (optional) |
| PW label | TC | S=0 | TTL = 3 | |
| Label = 13 | TC | S=1 | TTL | GAL header (optional) |
| 0001 | Ver=0000 | Reserved | Channel Type = 0x7 | GACH (optional) |
| BFD | | | | |

SWITCHING A SERVICE PATH OVER TO AN ALTERNATIVE SERVICE PATH

TECHNICAL FIELD

The present disclosure generally relates to networking systems and methods. More particularly, the present disclosure relates to Segment Routing (SR) and service switchover for re-routing traffic to an alternative service path that is shorter than a backup SR path.

BACKGROUND

Segment Routing (SR) is a flexible, scalable way of performing source routing. With SR, a source is configured to choose a desired path to its destination and encode this path in a packet header as an ordered list of segments. With SR, the network no longer needs to maintain a per-application or per-flow state. Instead, the network obeys the forwarding instructions encoded in the packet header. SR can be directly applied to the Multiprotocol Label Switching (MPLS) architecture with no change in the forwarding plane. When an SR tunnel is created, the SR may contain either a single segment (i.e., a single path to the destination) or a segment list (i.e., a set of segments that the tunnel will encode to reach the destination). This gives the network operator the ability to steer traffic over different paths based on the requirements of the traffic and the state of the network.

In addition to the desired path, most operators may also configure protection for these SR MPLS tunnels using schemes such as Loop Free Alternative (LFA), Topology Independent Loop Free Alternative (TI-LFA) etc. These may provide sub-50 msec protection upon the detection of any failure along the desire path (i.e., primary link), a faulty node along the path, a faulty Shared Risk Link Group (SRLG), etc., regardless of the topology. These alternative paths, which may be used in the event of a defect in the primary path, allow traffic to be re-routed if necessary. An alternative path represents a post-convergence path, thereby avoiding any immediate flap. The primary and backup path computation may be completely automatic and may be pre-computed and installed prior to the actual failure of the primary path.

A problem with some SR alternative paths, however, is that they may require many more hops than would normally be needed along the primary SR path, causing a higher-layer service to experience more latency than desired. There is therefore a need in the field of telecommunications networks to provide a different approach to utilizing backup paths for a primary SR path (e.g., the shortest path) when a computed backup path for the primary SR path has more latency than alternative backup paths. For example, SR is a Transport layer, while Border Gateway Protocol (BGP) is a Service layer. The following description includes systems where there are generally two layers (i.e., the Transport layer and the Service layer).

BRIEF SUMMARY

The present disclosure discloses systems and methods for inducing a service fault in order to cause a system to resort to an alternative service on a shorter path. According to one embodiment, a system includes a processing device and a memory device. The memory device is configured to store software logic including instructions that, when executed, enable the processing device to determine when there is a defect in a primary Segment Routing (SR) path to a main destination and identify an available path to an alternative destination that is shorter than a backup SR path to the main destination. The instructions further enable the processing device to switch a main service associated with the main destination over to an alternative service associated with the alternative destination based on the determining and the identifying.

According to another embodiment, a method is described in the present disclosure. The method includes a step of causing a backup Segment Routing (SR) path in an Autonomous System (AS) to fail, where the backup SR path is configured to carry traffic when a defect is detected on a primary SR path. The method also includes a step of switching to a backup service path for performing a backup service when the backup SR path fails.

According to yet another embodiment, a non-transitory computer-readable medium configured to store software logic is disclosed. The software logic has instructions that, when executed, enable one or more processing devices to cause a backup Segment Routing (SR) path in an Autonomous System (AS) to fail, whereby the backup SR path configured to carry traffic when a defect is detected on a primary SR path. The instructions further enable the one or more processing devices to switch to a backup service path for performing a backup service when the backup SR path fails.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 8 is a diagram illustrating a service OAM frame for a primary path in the AS of FIG. 8, according to various embodiments;

FIG. 9 is a diagram illustrating a service OAM frame for a backup path in the AS of FIG. 8, according to various embodiments;

FIG. 11 is a diagram illustrating a service OAM frame for a primary path in the AS of FIG. 11, according to various embodiments;

FIG. 12 is a diagram illustrating a service OAM frame for a backup path in the AS of FIG. 11, according to various embodiments;

FIG. 13 is another diagram illustrating a service OAM frame for the backup path in the AS of FIG. 11, according to various embodiments.

DETAILED DESCRIPTION

Figure 1:
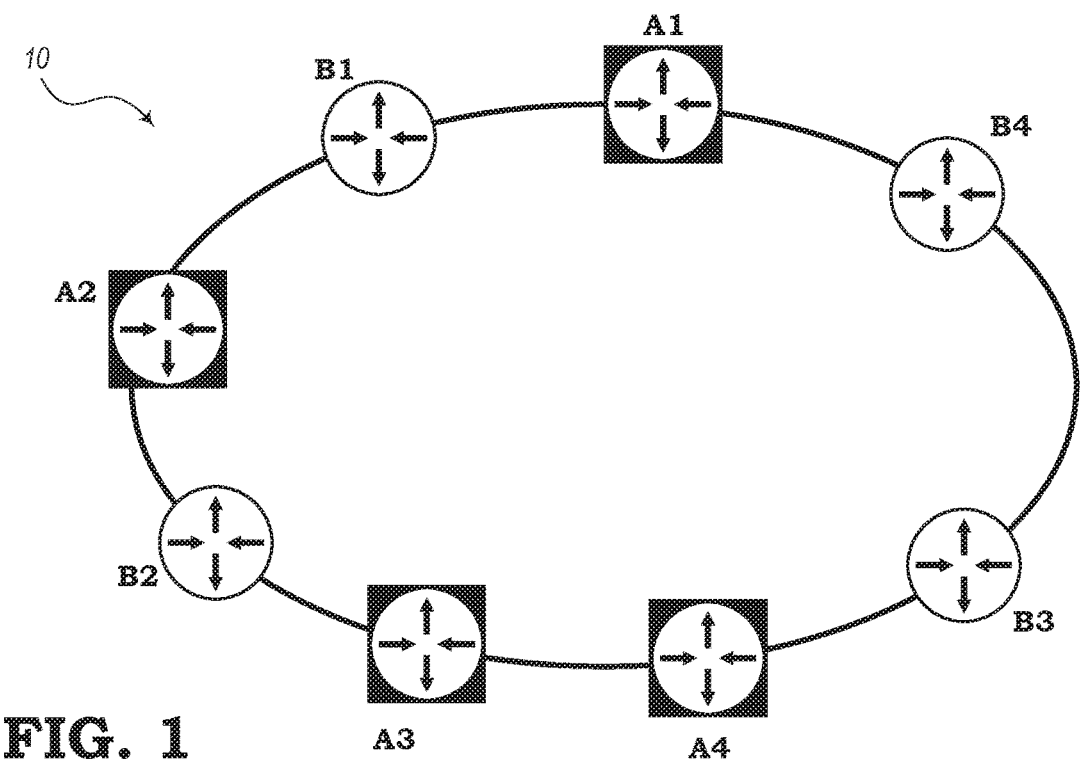
FIG. 1 is a diagram illustrating an Autonomous System (AS) having a plurality of nodes arranged with a ring topology for enabling Segment Routing (SR), according to some embodiments.

The present disclosure relates to systems and methods for re-routing traffic within a network or Autonomous System (AS) of a telecommunications system. Normally, a primary Segment Routing (SR) path may be established from a source node to a destination node and may represent the shortest path (e.g., fewest number of hops) between the source node and destination node. Also, at least one backup or alternative path (e.g., not the shortest path) may be established between the source node and destination node to be used when a fault is detected along the primary SR path. In SR, the source node chooses the primary path and backup paths within the transport layer.

Network services within a service layer are typically subject to the routing protocols used for the carrying data in the transport layer. Within the realm of SR, traffic can be re-routed on a backup or protection path in the event of a fault on the primary path. However, it has been recognized that this backup path may be noticeably longer (e.g., having more hops or having other higher metrics) to the destination compared to the primary path. As such, the systems and methods of the present disclosure may be configured to determine whether an available alternative path to any one of a number of alternative destinations (i.e., associated with any one of a number of alternative but similar services) would be shorter (e.g., fewer hops) compared to the normal backup/protection SR path to the initially designated destination. Thus, the present disclosure enables the process of re-routing traffic based on a backup or alternative "service" instead of using a longer backup or alternative path for an original service. In some cases, the systems and methods described herein may intentionally cause a backup SR path to fail in the transport layer so that an alternative service can be used in the service layer instead of using a longer backup path in the transport layer.

Operation, Administration, and Maintenance (OAM) techniques are used within an AS or network for monitoring the network in order to determine its topology. Also, OAM devices may be used to detect faults within the network to determine if/when a primary path is unavailable. When a fault is detected, the OAM devices may control the switching or re-routing to a backup path. In the present disclosure, the OAM devices may be used to control the re-routing processes to take advantage of a potentially shorter path for providing another service (e.g., access to the Internet via a different Internet gateway device) instead of attempting to restore connection to an original destination node (e.g., an original Internet gateway device) via a longer backup path.

One solution may be to configure the SR transport OAM fault detection timers higher than the Border Gateway Protocol (BGP) service OAM fault detection timers. However, this configuration of timers is typically not done in most deployments. Also, changing the "transport" fault detection timers would affect all "services" using that particular "transport." This solution would apply to all services using that particular SR tunnel. Even if there was a service not needing this behavior, it would be affected by the SR tunnels OAM fault timer.

OAM devices are configured to indicate faults, monitor performance, manage security, and perform other management functions for the network or AS. One of the goals of OAM is to provide restoration in a timely manner when a fault is detected in a primary path. OAM packets can be injected into the normal stream of data packets at the transport layer of the OSI model to determine performance and to detect faults such as an improperly configured node, an unidentified or misplaced node, a disconnected or faulty node, link failure, etc.

In operation, the systems of the present disclosure do not need to use larger timers for "transport" tunnels, which may cause havoc in deployments. According to the embodiments of the present disclosure, the focus is not on "transport" tunnels, but instead is on "service." Since the systems of the present disclosure are service specific, each particular service can decide its intended behavior and does not necessarily follow the typical "transport" tunnel schemes.

That is, the present disclosure includes situations where a fault on a primary tunnel would cause a switch to a backup tunnel. However, the backup tunnel may introduce significantly more latency. If there is an available tunnel to an alternative destination associated with a similar service and if this alternative-service tunnel is shorter than the backup tunnel, the systems and methods herein may purposefully cause the backup tunnel of the original service to fail, causing a higher-layer service switchover to the alternative service. With the service switchover, traffic is then rerouted to the shorter alternative-service tunnel.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram showing an embodiment of an Autonomous System (AS) 10, or network, having a plurality of nodes A1, A2, A3, A4, B1, B2, B3, B4 connected together in a ring topology. It should be noted that the AS 10 may include any suitable configuration of nodes for enabling SR along any number or arrangement of different paths and is not necessarily limited to the ring topology as shown. The nodes may be configured as routers, switches, or other suitable network elements for routing data traffic throughout the AS 10. According to some embodiments, the nodes A1, A2, A3, and A4 may represent interior routers and the nodes B1, B2, B3, and B4 may represent border routers, edge routers, or gateway routers.

With the ring topology (or other suitable topology), traffic may be designed to flow along a shortest path from a source node to a destination node in a first direction (e.g., clockwise). However, the ring topology also allows traffic to flow in the opposite direction (e.g., counterclockwise) when there is a fault between the source node and the destination node along the shortest path. For example, node B1 may represent a source node intending to route traffic to node B4 along a shortest path (i.e., B1 to A1 to B4). When a fault is detected along this shortest path (i.e., B1-A1-B4), traffic may be re-routed along a longer backup path (i.e., B1-A2-B2-A3-A4-B3-B4). Thus, the ring topology enables Segment Routing (SR) in the AS 10 with a desired, shortest path along a first route in a first direction and an alternative, longer path along a second route in a second direction.

Considering the ring topology in FIG. 1, there may be a Multi-Protocol Label Switching (MPLS)-based SR tunnel with node B1 as the source and node B4 as the destination. Assuming all link costs to be the same, the primary path would be computed as B1-A1-B4 since this is the shortest path. The backup path (i.e., the post convergence path) would be computed as B1-A2-B2-A3-A4-B3-B4. Upon any link or node failure in the primary path B1-A1-B4, the packets from node B1 and destined for node B4 will be sent on the backup path.

Segment Routing (SR) is a "transport" mechanism which is utilized by "services" such as Border Gateway Protocol (BGP), Layer 2 Virtual Private Network (L2-VPN), etc. Typically, the network operators monitor both transport and services using Operation, Administration, and Maintenance (OAM) schemes and may include variations of Bidirectional Forwarding Detection (BFD), such as Internet Protocol (IP) BFD (IP-BFD), Label-Switched Path (LSP) BFD (LSP-BFD), Multi-hop IP-BFD, Virtual Circuit Connection Verification (VCCV) BFD (VCCV BFD), etc. Whenever a "transport OAM" scheme detects a fault in the primary link, a switchover to the backup path is performed without affecting either the "service" (e.g., Layer 3 Virtual Private Network (L3-VPN), BGP, L2-VPN, Ethernet Virtual Private Network (EVPN), etc.) or the "service OAM" (VCCV BFD, Multi-Hop IP-BFD, LSP-BFD, etc.). This is achieved by running the "service OAM" at a higher monitoring timer than the "transport OAM." Thus, any fault in the primary path of the "transport" layer remains agnostic to "service" and the "service" is able to continue unimpaired. This is usually the intent in most service provider networks.

However, the embodiments of the present disclosure use a different approach. In some use-cases, a "service" would need to "failover" (e.g., fail along a first service gateway device in order to utilize a more proximate service gateway device). In this situation, a different SR tunnel would be used for routing traffic to a different destination as opposed to utilizing a backup SR tunnel to the same destination. The premise is to recover a "service" over an Interior Gateway Protocol (IGP)-based SR tunnel via a shorter path and not over a longer SR path. Since SR has no concept of maximum hop count (like RSVP), another strategy could be used within the SR scheme, as described in the present disclosure.

Figure 2:
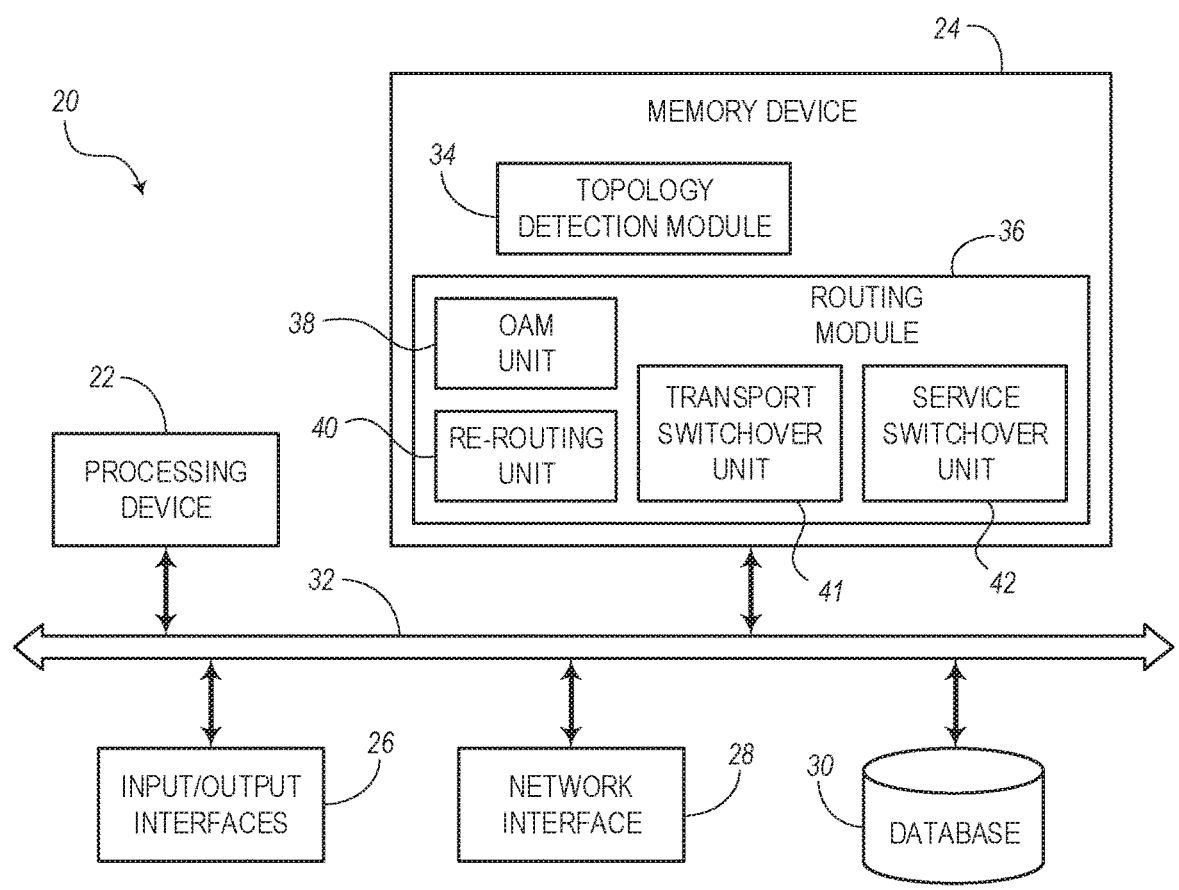
FIG. 2 is a block diagram illustrating a service re-routing system, according to various embodiments of the present disclosure.

FIG. 2 is a block diagram illustrating an embodiment of a service re-routing system 20 for re-routing "services" within the AS 10 of FIG. 1. In the illustrated embodiment, the service re-routing system 20 may be a digital computer that, in terms of hardware architecture, generally includes a processing device 22, a memory device 24, input/output (I/O) interfaces 26, a network interface 28, and a database 30. The memory device 24 may include a data store, database (e.g., the database 30), or the like. It should be appreciated by those of ordinary skill in the art that FIG. 2 depicts the service re-routing system 20 in a simplified manner, where practical embodiments may include additional components and suitably configured processing logic to support known or conventional operating features that are not described in detail herein.

The components (i.e., 22, 24, 26, 28, 30) are communicatively coupled via a local interface 32. The local interface 32 may be, for example, but not limited to, one or more buses or other wired or wireless connections. The local interface 32 may have additional elements, which are omitted for simplicity, such as controllers, buffers, caches, drivers, repeaters, receivers, among other elements, to enable communications. Further, the local interface 32 may include address, control, and/or data connections to enable appropriate communications among the components 22, 24, 26, 28, 30.

The processing device 22 is a hardware device adapted for at least executing software instructions. The processing device 22 may be any custom made or commercially available processor, a central processing unit (CPU), an auxiliary processor among several processors associated with the service re-routing system 20, a semiconductor-based microprocessor (in the form of a microchip or chip set), or generally any device for executing software instructions. When the service re-routing system 20 is in operation, the processing device 22 may be configured to execute software stored within the memory device 24, to communicate data to and from the memory device 24, and to generally control operations of the service re-routing system 20 pursuant to the software instructions.

It will be appreciated that some embodiments of the processing device 22 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 22 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 26 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 26 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 28 may be used to enable the service re-routing system 20 to communicate over a network, such as the AS 10, the Internet, a wide area network (WAN), a local area network (LAN), and the like. The network interface 28 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 28 may include address, control, and/or data connections to enable appropriate communications on the AS 10.

The memory device 24 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 24 may incorporate electronic, magnetic, optical, and/or other types of storage media. The memory device 24 may have a distributed architecture, where various components are situated remotely from one another, but can be accessed by the processing device 22. The software in memory device 24 may include one or more software programs, each of which may include an ordered listing of executable instructions for implementing logical functions. The software in the memory device 24 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 24 may include a data store (e.g., database 30) used to store data. In one example, the data store may be located internal to the service re-routing system 20 and may include, for example, an internal hard drive connected to the local interface 32 in the service re-routing system 20. Additionally, in another embodiment, the data store may be located external to the service re-routing system 20 and may include, for example, an external hard drive connected to the I/O interfaces 26 (e.g., SCSI or USB connection). In a further embodiment, the data store may be connected to the service re-routing system 20 through a network and may include, for example, a network attached file server.

Moreover, some embodiments may include a non-transitory computer-readable storage medium having computer readable code stored in the memory device 24 for programming the service re-routing system 20 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 22 that, in response to such execution, cause the processing device 22 to perform a set of operations, steps, methods, processes, algorithms, functions, techniques, etc. as described herein for the various embodiments.

As illustrated in FIG. 2, the memory device 24 may be configured to store various software or firmware programs for enabling the service re-routing system 20 to perform re-routing processes as disclosed herein. For example, the memory device 24 may include a topology detection module 34 and a routing module 36. Also, the routing module 36 may be further configured to perform various functions for routing traffic in the AS 10. The routing module 36, in some embodiments, may include an Operations, Administration, and Maintenance (OAM) unit 38, a re-routing unit 40, a transport switchover unit 41, and a service switchover unit 42.

According to a generalized operation of the topology detection module 34 and routing module 36, instructions stored in the memory device 24 may cause the processing device 22 to determine the topology of the AS 10 or network to find the shortest paths from certain initiating nodes to certain destination nodes. The topology detection module 34 may also allow the processing device 22 to find backup or protection paths to the various destination nodes, leading to a convergence or understanding of the state of the nodes with respect to each other.

The OAM unit 38 may be configured to allow the processing device 22 to monitor when a primary path is defective to determine whether a backup path should be taken instead. For instance, the OAM module 34 may be configured to determine faults in a node or in a link between two adjacent nodes. The OAM unit 38 may also determine whether an alternative path to a different destination (i.e., a destination that may enable an alternative or similar service as the one provided by the initial destination) is available, whereby this alternative path may have been determined to be shorter than the original backup SR path to the original destination. In the case where another alternative path may be found to be shorter than the original backup SR path, a backup service may be used. However, before the service is switched, a transport switchover unit 41 may be configured to switch to the original backup path, which is destined to quickly fail. When the original backup path fails, the system may resort to another service.

When it is determined that the backup service is to be used, the service switchover unit 42 is configured to switch the original service (to the original destination) over to an alternative service associated with (or utilizing or passing through) an alternative destination. The service switchover unit 42 may be configured to force the switchover by any means. In one example, the service may be switched over by forcing the backup SR path to the original destination to fail in the transport layer, thereby causing a backup plan to be initiated on the service layer where another destination may be selected to perform an alternative service to essentially recover the original service.

It should be understood that the service re-routing system 20 of FIG. 2 may also be used for re-routing services in the AS 10 or within other networks or Autonomous Systems, such as those shown in FIGS. 7, 10, and 14 described below. The re-routing of services, for example, may be performed when a defect is detected on a primary path. Also, instead of relying on a backup or protection path for re-routing to the same destination, the service re-routing system 20 of the present disclosure is configured to perform a service recovery process using a different destination node, whereby the path to the new destination node may represent a shorter path with respect to the SR protection path.

The OAM unit 38 is describe hereinbelow in greater detail. In some embodiments, the OAM unit 38 may be configured to perform various functions, such as path convergence, transport OAM processes, service OAM processes, etc. The OAM unit 38 may be configured to determine a primary path (e.g., shortest SR path) between a source node and a destination node. Also, the OAM unit 38 may be configured to determine one or more alternative paths to be used as protection paths in the event that the primary path includes a defect or would be impractical to use for any reason.

In addition to SR-based path calculations, the OAM unit 38 may provide additional path convergence processes, including determining a primary service, which may represent a service that would normally be conducted over the primary SR path from the source node to the destination node. However, not only is a primary service path determined, but also a path for a backup service may also be determined. This backup service path may be used instead of a longer backup SR path for providing a similar or equivalent service in place of the originally intended service. The backup service path may extend from the original source node to an alternative destination node that may be configured to provide the similar or equivalent service.

After path convergence processes for detecting primary paths and backup paths for the various services, the OAM unit 38 may be used to determine the status of the nodes within the AS 10 and the links between the nodes. Transport OAM processes may be performed to monitor the status on the transport layer, while service OAM processes may be performed to monitor the status on the service layer.

The transport OAM processes of the OAM unit 38 may enable the processing device 22 to construct frames that are injected into the header of packets. The frames are used for defining the routing parameters. It should be noted that the transport OAM may be agnostic to services of the AS. Transport OAM processes may be configured to detect faults in the primary path to determine whether it may be necessarily to resort to a backup path. The primary path may be monitored by analyzing characteristics of the SR tunnels between the adjacent nodes.

The service OAM processes of the OAM unit 38 may enable the processing device 22 to run at a higher monitoring timer than the transport OAM processes and may be subjected to results of the transport OAM. The service OAM may be configured to monitor the Border Gateway Protocol (BGP) sessions of the various services. With respect to the example of the AS 10 shown in FIG. 1, a first service may involve communication between a source node B1 and a destination node B4. A second service may involve communication between the source node B1 and another destination node B3. The service OAM module 44 may therefore monitor service failures and switchover to an alternative service if one service fails.

According to the various embodiments of the present disclosure, the service OAM processes of the OAM unit 38 may be configured to allow a Time-to-Live (TTL) value to be changed (as explained in more detail below), where the TTL may be included in a frame that is injected into the data path. If a BGP session fails, the service OAM portion of the OAM unit 38 may be configured to use another service associated with another BGP session. Thus, the service OAM can provide a service switchover, utilizing the service switchover unit 42. As described in the present disclosure, the service OAM enables the switchover in the situation where a TTL is intentionally set to a low value to cause a backup SR path to fail on account of an expiration of the TTL. Therefore, by forcing the backup path to fail, the re-routing unit 40 is configured to resort to a backup service, which may be determined to be a shorter path as opposed to a longer backup SR path.

The re-routing unit 40 may be configured in any other suitable fashion with different modules for performing certain functions. Particularly, the re-routing unit 40 is not only configured to re-route traffic based on a "transport" layer (e.g., as is done in conventional SR processes), but also is configured to re-route traffic based on a "service" layer. The re-routing unit 40 in this embodiment may be configured to include various functions related to re-routing on each the transport layer or service layer. For example, the re-routing unit 40 may be configured to set a Time-To-Live (TTL) value, determine when the TTL is exhausted, re-route along a new path, and re-route to a new destination. These functions may include changing the path if necessary or changing the destination if necessary, in an attempt for recovery on the transport layer or for recovery on the service layer.

The process of setting the TTL value enables the packet header to be configured with a TTL for use with a backup SR path. In accordance with the purposes of the present disclosure, the TTL may be intentionally set to a low value that would cause a backup SR path to fail, thus forcing the AS to switchover to a backup "service." For example, the TTL value may be set to "one hop" so that the backup path quickly fails. In another example, the TTL value may be set to a value equal to the maximum number of hops from the source node to the destination node in the primary path.

The re-routing unit 40 may also detect TTL expiry or TTL exhaust. As such, the TTL value may be decremented on the packet header after each hop to an adjacent node. When the TTL value reaches zero, the packet may be discarded and an indication may be made that the packet has been dropped in order that an alternative strategy can be used to perform the intended service. Also, when the TTL expires, an alternative strategy may include switching or changing the original service on the service layer to a backup service. The new service may include also changing to a new destination node instead of the original longer-path destination node. For example, the service switchover unit 42 may be configured to switch to the alternative service, such as by implementing the TTL exhaust strategy.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 3:
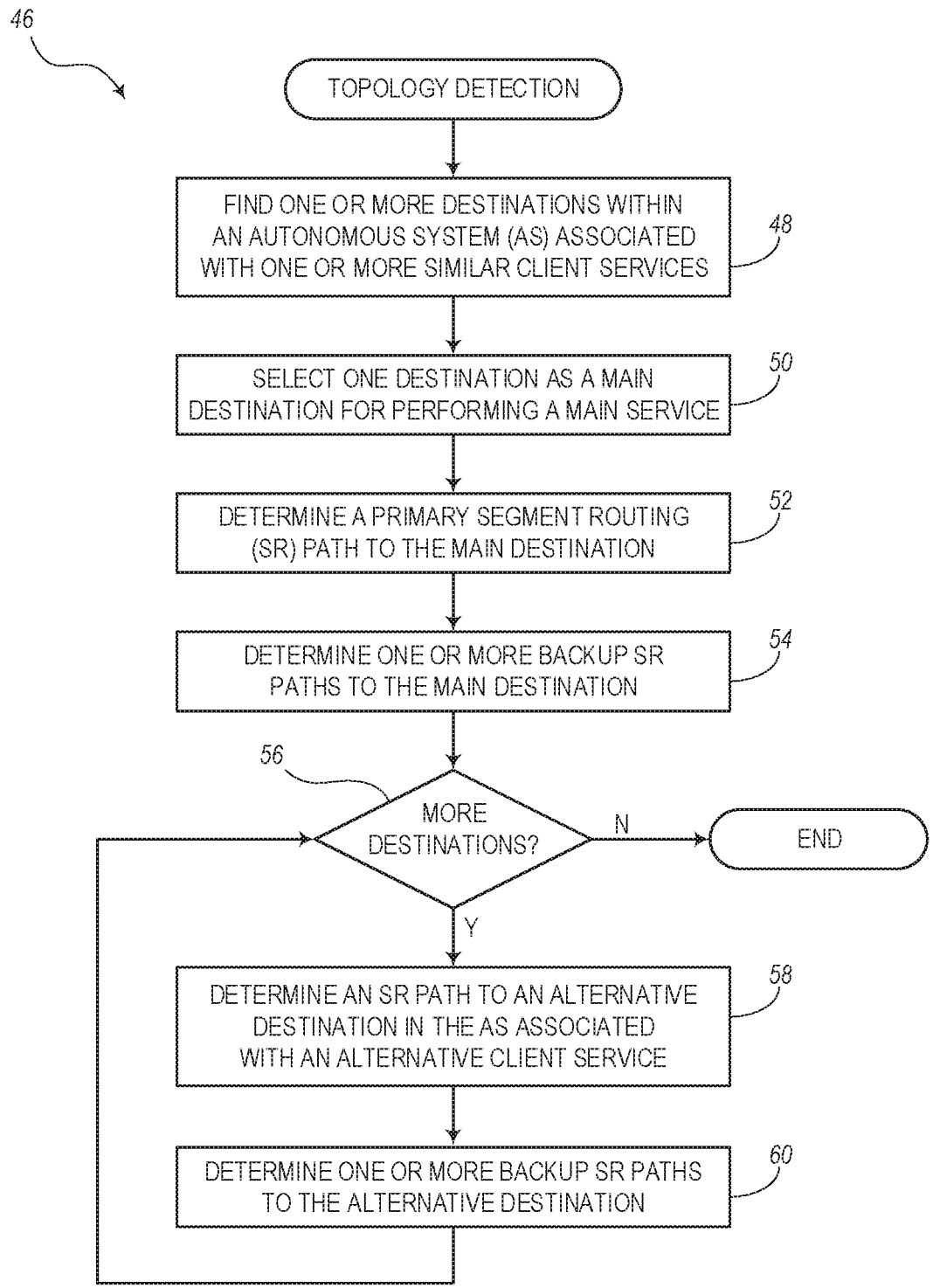
FIG. 3 is a flow diagram illustrating a method for detecting the topology of a network, according to various embodiments.

FIG. 3 is a flow diagram of an embodiment of a method 46 for detecting the topology of a network, which may be implemented by the topology detection module 34 shown in FIG. 2. The method 46 includes a step of finding one or more destinations within an AS associated with one or more similar services, as indicated in block 48. The one or more destinations within the AS may be configured to communicate user traffic along different paths via similar services. The same user traffic may be switched over an alternative service, when necessary, whereby the user traffic is not affected by the various paths and ultimately is configured to reach its intended destination outside the AS. Block 50 indicates that the one destination is selected as a main destination for performing a main service. As indicated in block 52, the method 46 includes determining a primary Segment Routing (SR) path to the main destination. Then, one or more backup SR paths to the main destination are determined, as indicated in block 54.

Method 46 further includes the step of determining whether additional destinations associated with other services are available, as determined in decision diamond 56. If not, the method 46 end. Otherwise, the method 46 proceeds to block 58, which indicates that an SR path to an alternative destination in the AS is determined, where this alternative destination is associated with an alternative client service. As indicated in block 60, the method 46 also includes determining one or more backup SR paths to the alternative destination mentioned with respect to block 58. At this point, the method 46 returns to decision diamond 56 to determine if there are more destinations. If so, blocks 58 and 60 are repeated for each of the next alternative destinations associated with each of the next alternative client services. It should be noted that these alternative destination within the AS may be linked to the same or similar networks for providing the same or similar client services. The user traffic is unaffected by a switching process that switches to alternative paths associated with alternative services since the user traffic eventually reaches its desired destination regardless of the path.

Figure 4:
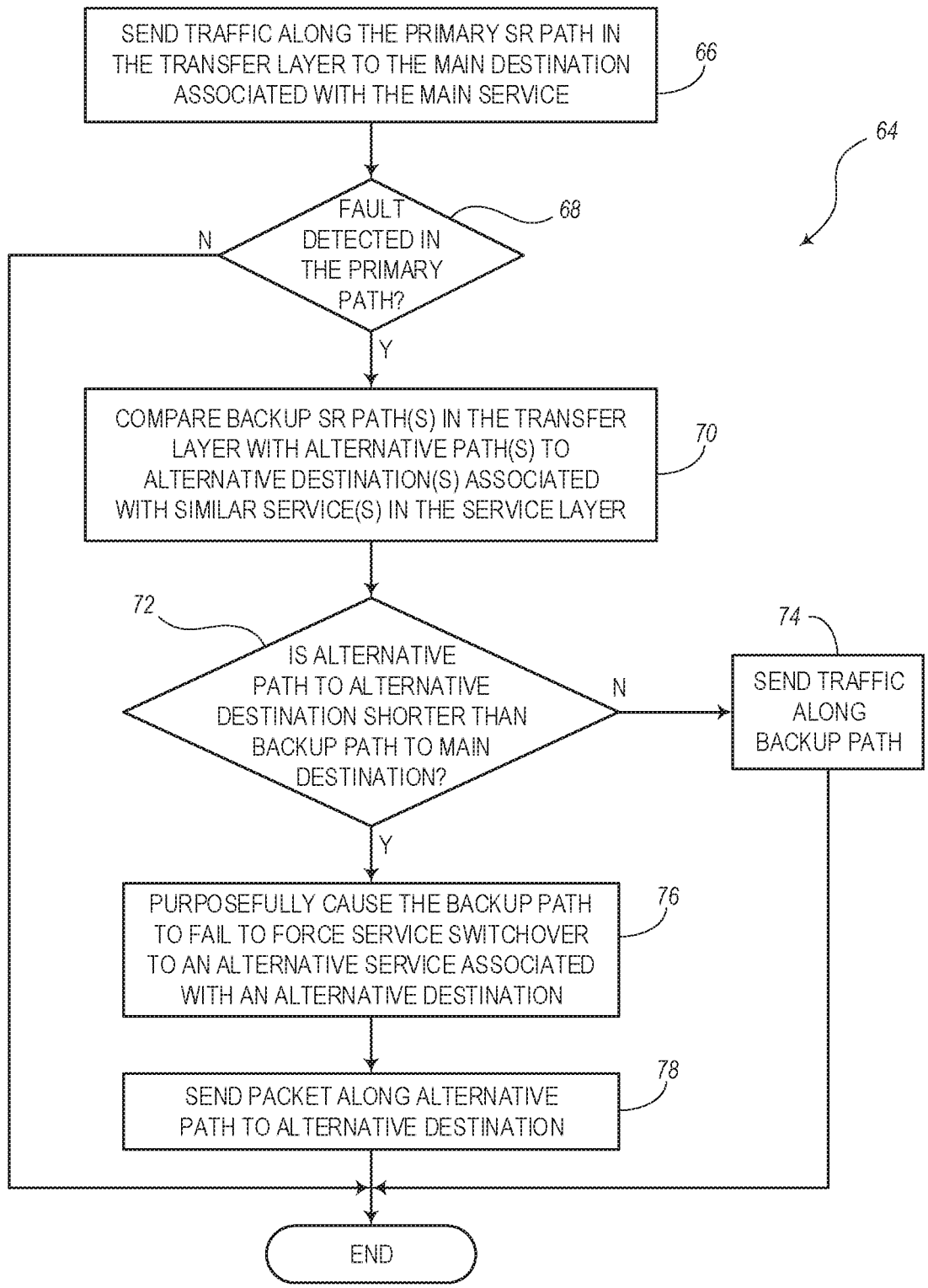
FIG. 4 is a flow diagram illustrating a detailed method for performing service re-routing when necessary, according to various embodiments.

FIG. 4 is a flow diagram illustrating a detailed embodiment of a method 64 for performing service re-routing when necessary. The method 64 includes the step of sending traffic along the primary SR path in the transfer layer to the main destination associated with the main service, as indicated in block 66. As shown in decision diamond 68, the method 64 includes determining if or when a fault has been detected in the primary path. If a fault has not been detected, then the traffic may continue to flow to the main destination according to an original plan, and, in this re-routing method 64, no re-routing is necessary and the method 64 ends. However, when a fault is detected, the method 64 proceeds to block 70, which shows that the method 64 performs the process of comparing one or more backup SR paths in the transfer layer with one or more alternative paths leading to one or more alternative destinations.

In decision diamond 72, the method 64 includes determining whether an alternative path to an alternative destination is shorter than a backup path to the main destination. If the alternative service destination is not shorter, then the method 64 resorts to regular SR backup paths, whereby the method 64 sends the traffic along the backup path, as indicated in block 74. Otherwise, when it determined that the alternative destination is indeed shorter than the backup SR path, then the method 64 proceeds to block 76.

In block 76, the method 64 includes purposefully causing the backup path to fail to force a service switchover to an alternative service associated with an alternative destination. In some embodiments, the switchover described in block 76 may be performed according to the method 90 described below with respect to FIG. 6. Once switched over to the alternative service, the method 64 includes sending packets along the alternative path to the alternative destination, as indicated in block 78.

Figure 5:
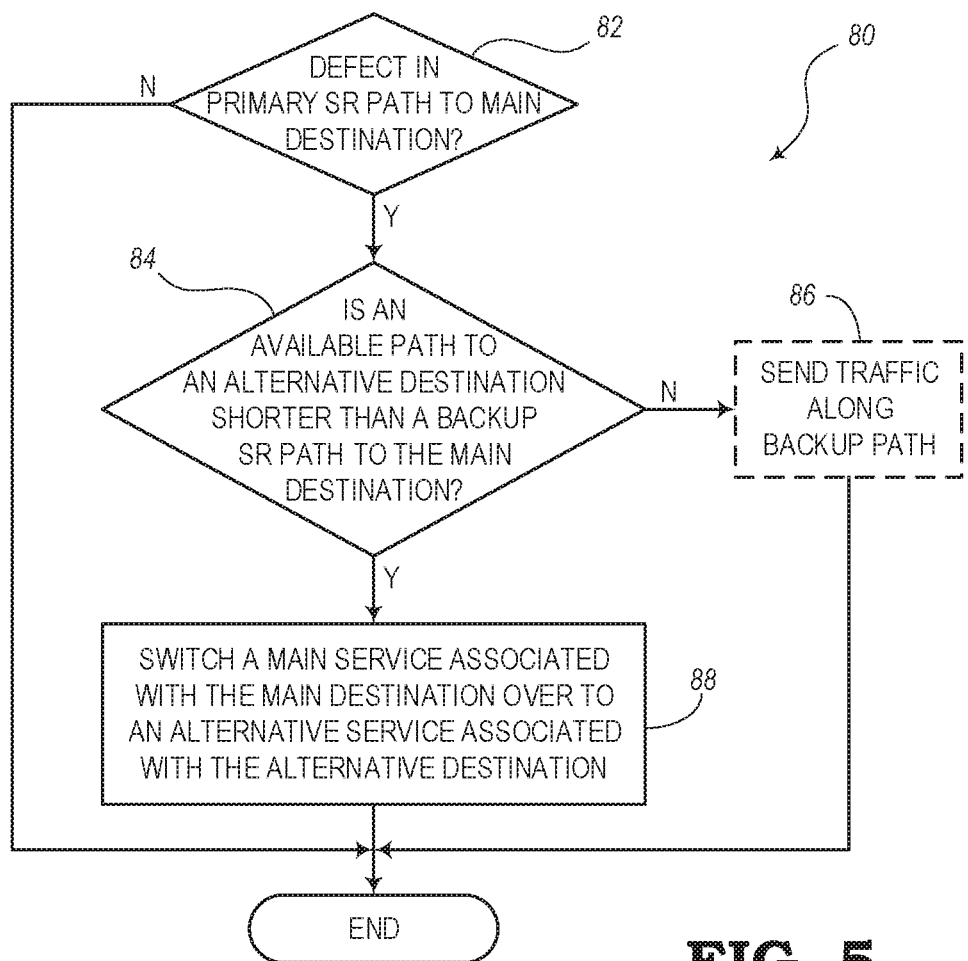
FIG. 5 is a flow diagram illustrating another method for performing service re-routing when necessary, according to various embodiments of the present disclosure.

FIG. 5 is a flow diagram showing another method 80 for performing service re-routing when needed. The method 80 includes determining, as described in decision diamond 82, whether there is a defect in the primary SR path to the main destination. If not, the method ends. When the method determines there is a defect in the primary SR path to the main destination, the method proceeds to decision diamond 84. As described in decision diamond 84, the method 80 includes determining whether there is an available path to an alternative destination that is shorter than a backup SR path to the main destination. If not, the method 80 may include sending traffic along the backup path, as indicated in block 86. However, when the method 80 identifies the available path to the alternative destination that is shorter than the backup SR path to the main destination, the method 80 proceeds to block 88. Block 88 includes, based on the determining (step 82) and the identifying (step 84), switching a main service associated with the main destination over to an alternative service associated with the alternative destination.

Figure 6:
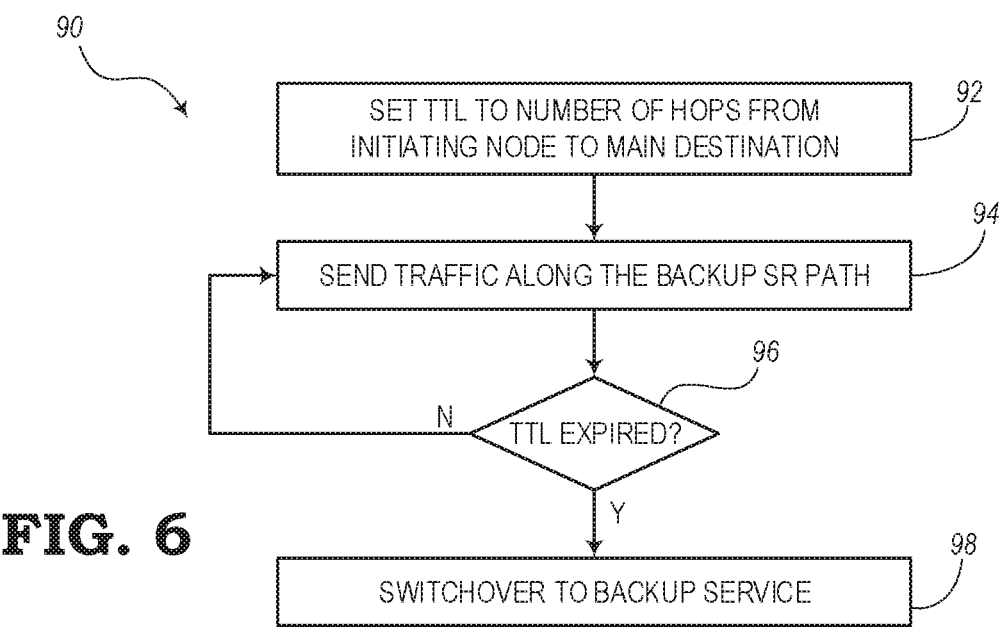
FIG. 6 is a flow diagram illustrating a service switchover method, according to various embodiments.

FIG. 6 is a flow diagram illustrating an embodiment of a service switchover method 90. In this embodiment, the method 90 includes setting a TTL to a value equal to the number of hops from an initiating node to a main destination node, as indicated in block 92. The method 90 also includes sending the traffic along the backup SR path, as indicated in block 94. Decision diamond 96 includes determining if or when the TTL has expired. If the TTL has not expired, the method 90 turns back to block 94 to continue to allow the traffic to be sent along the backup path. When it is determined in decision block 96 that the TTL has expired, the method 90 proceeds to block 98, which indicates that the process of switching over to the backup service is executed.

Figure 7:
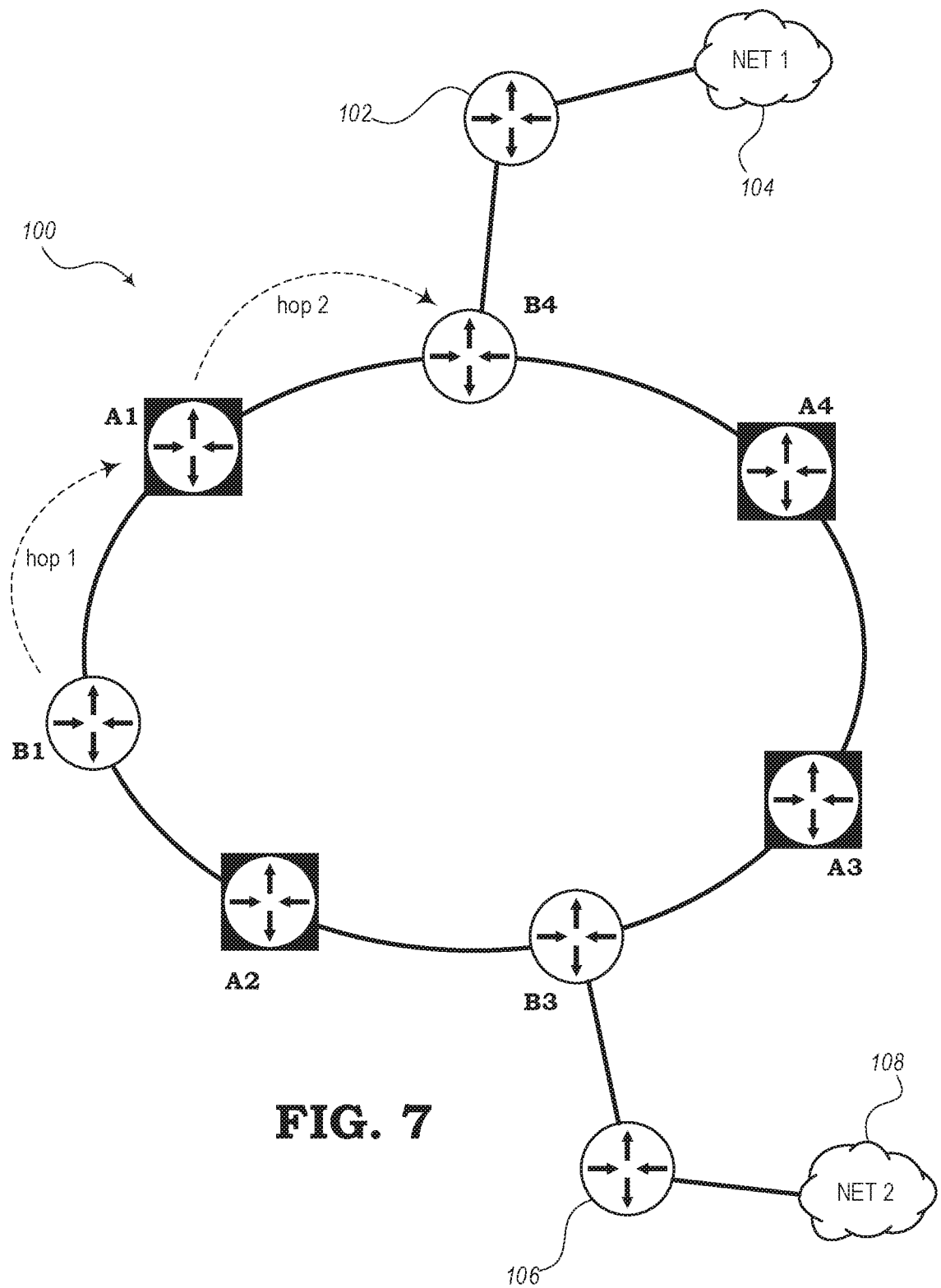
FIG. 7 is a diagram illustrating an AS having a plurality of nodes arranged with a ring topology for enabling SR and for providing two separate services, according to some embodiments.

FIG. 7 is a diagram showing an example of an AS 100 having a plurality of nodes arranged within a ring topology for enabling SR and for providing two separate services. A first service may be provided to the AS 100 by a first gateway device 102 (e.g., Internet gateway), which may be configured to enable Internet access via a first network 104. A second service may be provided to the AS 100 by a second gateway device 106 (e.g., another Internet gateway), which may be configured to enable Internet access via a second network 108. The gateway devices 102, 106 may be configured as Internet gateways, which are nodes that connect two different networks using different communication protocols (e.g., IGP and BGP).

As such, the two services may be similar (e.g., Internet access), but may be different only in that they are provided by different gateway devices 102, 106 and may utilize different networks (e.g., first network 104 or second network 108) to enable the service. In some embodiments, the first gateway device 102 may be utilized by a first Internet Service Provider (ISP), while the second gateway device 106 may be utilized by a second ISP. According to other embodiments, the gateway devices 102, 106 may be utilized by the same ISP using different networks 104, 108.

The gateway devices 102, 106 may be configured to provide other types of network transport services to ISPs and may be a provider of connectivity to ISPs. In turn, the ISPs may be connected to Internet routers to provide multiple ways to access the Internet. A network administrator of the AS 100 may decide whether to utilize either the first Internet gateway 102 or the second Internet gateway 106 for connecting with node B1. In this example, it is assumed that the first gateway 102 is selected. Thus, the shorter path from node B1 to node B4 includes two hops from B1 to A1 to B4. However, when the path from B1 to B4 is broken, for whatever reason, a backup path can be selected.

As is shown in FIG. 7, a simple case may be considered in which there is only one SR tunnel header. There are seven nodes (e.g., routers) arranged in the ring topology shown in FIG. 7. The routers have SR primary and backup "transport" tunnels configured from B1 to B4 and from B1 to B3. The primary SR tunnel path from B1 to B4 is B1-A1-B4. The backup SR tunnel path from B1 to B4 is B1-A2-B3-A3-A4-B4. The primary SR tunnel path from B1 to B3 is B1-A2-B3. B1 has a primary "service" session configured via B4 to reach network 104 and a backup "service" session configured via B3 to reach network 108. Node B1 also has SR "transport OAM" monitoring and "service OAM" monitoring configured.

In a typical SR scenario, the backup path may connect node B1 to B4 over the longer path B1-A2-B3-A3-A4-B4. However, according to the operations of the various embodiments of the present disclosure, a backup "service" may be used. That is, instead of using the service provided by the first gateway device 102, a backup service provided by the second gateway device 106 may be used. Thus, instead or restoring the path to maintain the same destination node, the systems of the present disclosure restore the service (e.g., Internet access) by using another similar service that is provided at a different destination node. In this case, instead of looping around from node B1 to node B4 to restore the service, the traffic may be redirected from node B1 to node B3 to restore the service using a different gateway device.

An SR tunnel may be created between each pair of adjacent nodes within the AS 100. Again, the nodes are arranged within a ring topology as shown in FIG. 7. However, according to other embodiments, the AS 100 may include any suitable type of arrangement of nodes (e.g., mesh) for connecting the nodes such that multiple paths may be taken to communicate between a source node and a destination node. Also, the AS 100 may utilize the Interior Gateway Protocol (IGP) for enabling communication between nodes in the AS 100. The nodes B4 and B3 may also utilize Border Gateway Protocol (BGP) for communication with the gateway devices 102, 106. BGP may be used between the ISP routers (e.g., nodes B4 and B3) and the Internet gateway routers 102, 106.

SR is the "transport" with "transport OAM" monitoring between all devices. A first BGP session is conducted between node B1 and node B4 and a second BGP session may be conducted between node B1 and node B3. As mentioned above, node B4 is connected to gateway device 102 to the first network 104 (i.e., net 1), while node B3 is connected to gateway device 106 to the second network 108 (i.e., net 2). The BGP "service" layer utilizes SR "transport." Hence, the BGP service between nodes B1 and B4 utilizes the SR tunnel with a primary path as B1-A1-B4 and a backup path as B1-A2-B3-A3-A4-B4. The BGP service between nodes B1 and B3 utilizes the SR tunnel with a primary path as B1-A2-B3 and a backup path as B1-A1-B4-A4-A3-B3. The BGP "service" layer also has OAM monitoring for the first BGP session (e.g., between nodes B1 and B4) and the second BGP session (e.g., between nodes B1 and B3).

In the above case, when there is a fault along the SR primary path from B1 to B4, such as a fault on the B1-A1 link, a fault on the A1-B4 link, or a fault on the node A1 itself, the SR "transport OAM" device detects this fault and switches over to the backup SR tunnel from B1 to B4. However, upon a fault detection on the primary link, the network operator may want the BGP "service" session to fail in order that a backup service can be used whereby traffic would be routed instead via node B3 to gateway device 106. In conventional systems, there is no way to achieve this backup service restoration without failure along all paths to the initially intended service. In particular, a "transport OAM" monitoring timer would typically run faster than a "service OAM" monitoring timer and, as such, restoration would be on a "transport" layer for switching to the same node (i.e., node B4) over the backup SR path from B1 to B4.

The systems and methods of the present disclosure are able to utilize a service failure scheme to restore a service with a different BGP device. According to various embodiments, the primary BGP "service" session on B1, associated with communication along the primary path from B1 to B4, can be switched to a backup BGP "service" session of B1, associated with communication along the backup path from B1 to B3. This switching to the backup service can accomplished when the "service OAM" monitoring fails and the "transport OAM" fault reporting remains inconsequential to the BGP service.

According to various embodiments, one way to create this service failure to force service recovery on a shorter path is by using the Time-To-Live (TTL) value for limiting the number of hops that a packet can traffic before it expires. In this respect, a TTL exhaust scheme can be used in the "service OAM" frame to further orchestrate a "service OAM" failure whenever the "transport OAM" detects a fault in the primary path.

In this example, the TTL value in the outer (i.e., service session) frame can be set in the MPLS header to the maximum number of hops in the primary path. Since the primary path from B1 to B4 in this case has two hops (e.g., B1-A1 and A1-B4), the TTL may be set to "2." The TTL value may be stored in the "service OAM" frame of the MPLS header and decremented at each successive node. In this case, the BGP Service Monitoring frames utilizing the SR backup path would be dropped at node B3 (i.e., after 2 hops B1-A2 and A2-B3), which will cause a fault in the Service OAM. This would trigger a BGP "service" switchover from B1-B4 to B1-B3.

OAM frames are constructed and injected into the nodes of the AS 100, whereby the TTL field in the OAM frames is configurable. The TTL value can be configured using a profile and applied to the "service OAM" or it can be derived from the number of hops in the primary path (non-ECMP, unequal cost). For example, the TTL value can be set to the maximum number of hops in the primary path during "service OAM" packet injection.

At the service initiation node (e.g., node B1), the "service" TTL for the service OAM packet is set to the value equivalent to the max-primary-hop value (i.e., 2). The "service" TTL is then inherited by the "transport" TTL, thus setting the "transport" MPLS TTL carrying the service OAM payload to the same value (i.e., 2). When a failure occurs on the SR MPLS path between B1 and B4, a Topology-Independent Loop Free Alternative (TI-LFA) will determine the backup path, which may be longer than desired by the "service." In this example, the backup path B1-A2-B3-A3-A4-B4 is five hops, as shown in FIG. 7.

By using the process of the "transport" TTL inheriting the value from the "service" TTL at the service initiating node B1, the service OAM will expire on the new restored path, which is longer than two hops, thereby causing a fault for the service OAM. This will result in BGP session to go down between B1 and B4, causing node B1 to utilize an alternative reachability path to the Internet through node B3. This achieves the desired goal of enabling control on the service layer for influencing the path hop constraints on the transport layer.

One thing to note in this scenario is that the "service" TTL for OAM packet is not affected. Hence, the tunnel will be active for other services, which may not care about the constraints posed by this one service. In this respect, the systems of the present disclosure can provide the benefits of decoupling the constraints on one service OAM from other service constraints without affecting the transport for those services.

FIG. 8 is a diagram illustrating a service OAM frame 110 for a "primary" path in the AS of FIG. 7. The "service" OAM frame 110 exiting node B1 may transit over the active primary SR path (B1-A1-B4) in the AS 100 of FIG. 7. Note that the "transport" SR MPLS header includes the service OAM frame 110, which shows that the TTL of a SR tunnel label 112 is inherited from the TTL of a Pseudo-Wire label (i.e., PW label 114). As shown, TTL is set to "2" (i.e., TTL=2), first in the PW label 114 (based on the transport layer hops) and is then borrowed for the SR tunnel label 112. A "pseudo-wire," as described herein, may be a representation or emulation of a point-to-point connection or link between each pair of neighboring nodes in the AS 100 of FIG. 7 or other autonomous systems or packet-switched networks described in the present disclosure. The Pseudo-Wire (PW) emulates the operation of a link carrying a service through the AS 100.

FIG. 9 is a diagram showing a service OAM frame 115 for a "backup" path in the AS 100 of FIG. 7. Upon primary SR path failure, the service OAM frame 115 exits node B1 for routing traffic along the established backup path. However, according to the strategies of the present disclosure, the transmission is destined to fail since the backup path is longer than the alternative service path via B3.

The TTL in the PW label 116 is shown as being set to 2 (i.e., TTL=2). The TTL in the outer MPLS header with the SR tunnel backup label 118 of the service OAM frame 115, going from source node B1 to destination node B4, will be inherited from the service OAM frame 110 of the service MPLS header TTL. The service OAM frame 115 would be dropped at B3 (after two hops), thereby effecting a "service" switchover from node B1 to node B3 for communication with the second network 108 shown in FIG. 7.

Figure 10:
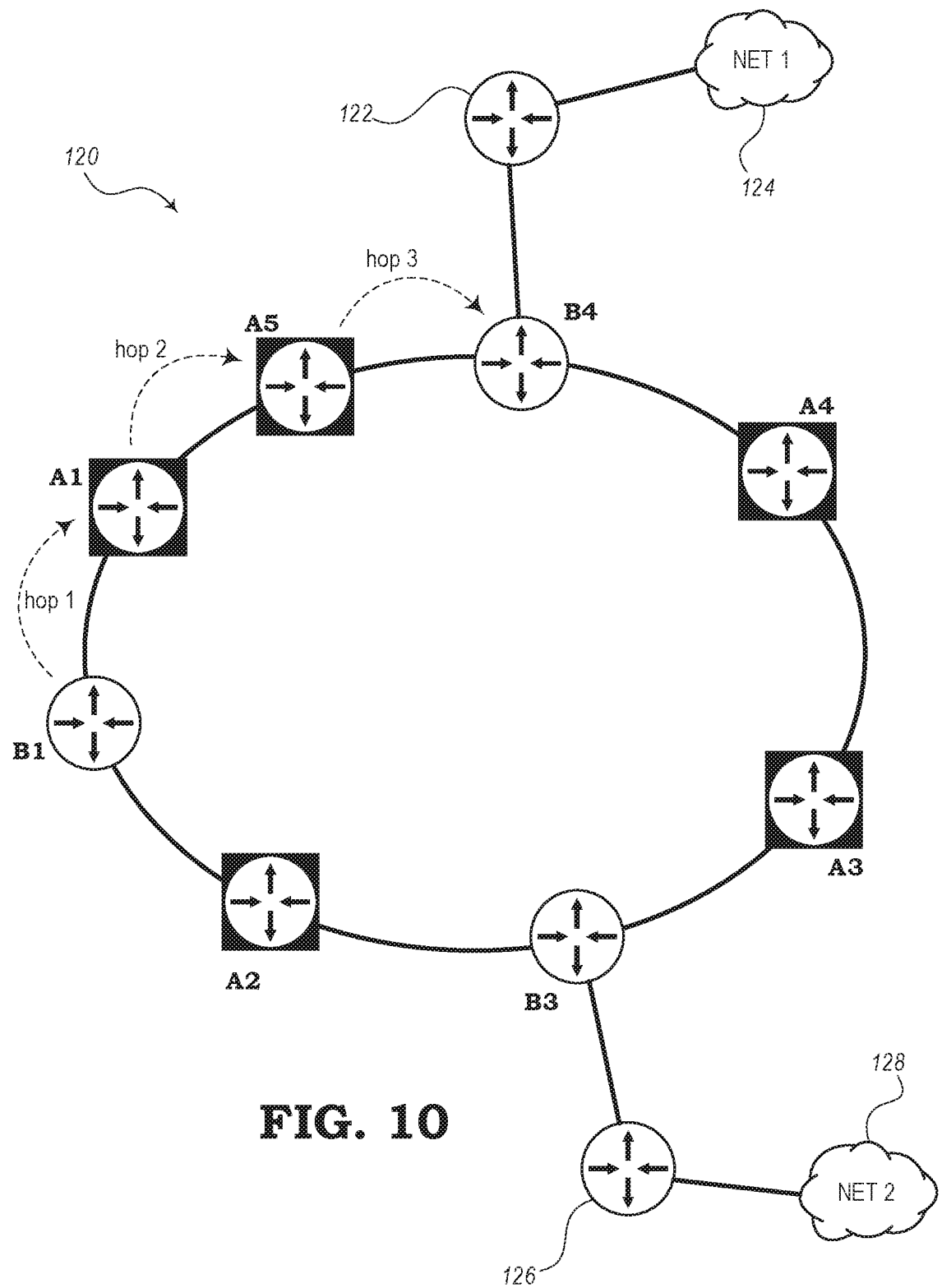
FIG. 10 is a diagram illustrating another AS having a plurality of nodes arranged with a ring topology for enabling SR and for providing two separate services, according to some embodiments.

FIG. 10 is a diagram illustrating an AS 120 or network having a plurality of nodes arranged with a ring topology for enabling SR and for providing two separate services, similar to the arrangement shown in the AS 100 with respect to FIG. 7. In this example, the AS 120 include eight nodes (e.g., routers) participating in the ring topology with SR tunnels linking the nodes together. The nodes have SR primary and backup "transport" tunnels configured from node B1 to node B4 and from node B1 to node B3. The primary SR tunnel path from B1 to B4 is B1-A1-A5-B4. The backup SR tunnel path from B1 to B4 is B1-A2-B3-A3-A4-B4. The primary SR tunnel path from B1 to B3 is B1-A2-B3. The backup SR tunnel path from B1 to B3 is B1-A1-A5-B4-A4-A3-B3.

Node B1 has a primary "service" configured via node B4 and ISP gateway 122 to reach a first network 124 and a backup "service" configured via node B3 and ISP gateway 126 to reach a second network 128. Node B1 also has SR "transport" OAM monitoring and "service" OAM monitoring configured. The "service" OAM monitoring frame 130 exiting B1 is shown in FIG. 11. Note that the service OAM frame 130 transits over the active primary SR path (B1-A1-A5-B4).

FIG. 11 is a diagram showing the service OAM frame 130 for the "primary" path in the AS 120 of FIG. 10. It should be noted that the "transport" SR MPLS header TTL is inherited from the TTL of a PW label 132. The inherited TTL is applied to the SR tunnel label 134 for defining the maximum hop count in the primary path. In this case, the primary path from B1 to B4 is B1-A1-A5-B4, which includes three hops, whereby the TTL is set to "3."

FIG. 12 is a diagram showing a first service OAM frame 140 for a "backup" path when a fault is detected in the primary path of the AS 120 of FIG. 10. The backup SR tunnel to B4 is defined by the first service OAM frame 140 and has two segment headers. Particularly, an outer layer segment header is a first SR tunnel backup label 142 and an inner level segment header is a second SR tunnel backup label 144 of the first service OAM frame 140. When the primary link fails, the TTL in the MPLS header with SR transport labels 142, 144 will be inherited from the "service" MPLS header TTL, which is set to "3."

FIG. 13 is a diagram showing a second service OAM frame 150 for the "backup" path when a fault is detected in the primary path of the AS 120 of FIG. 10. The second service OAM frame 150 may be used when the first SR backup tunnel label is popped. With the outer layer removed, the TTL is updated in the second label (i.e., the second SR tunnel backup label 152). In this case, the outer layer is popped when the TTL is "1." The label 152 inherits this TTL (i.e., TTL=1). The TTL of SR backup tunnel label 1 header will be decremented during swap operations of the SR process. The new (remaining) TTL is copied to the second SR tunnel backup label 152 once the first label 142 is popped. This service OAM frame 150 over the "backup" SR tunnel to B4 will be dropped after three hops when the path runs short at node A3 (i.e., three hops removed from node B1), thereby effecting a BGP "service" layer switchover. The service switchover includes a re-routing of the service from node B1 to node B3 for operation over ISP gateway 126 to the second network 128.

Figure 14:
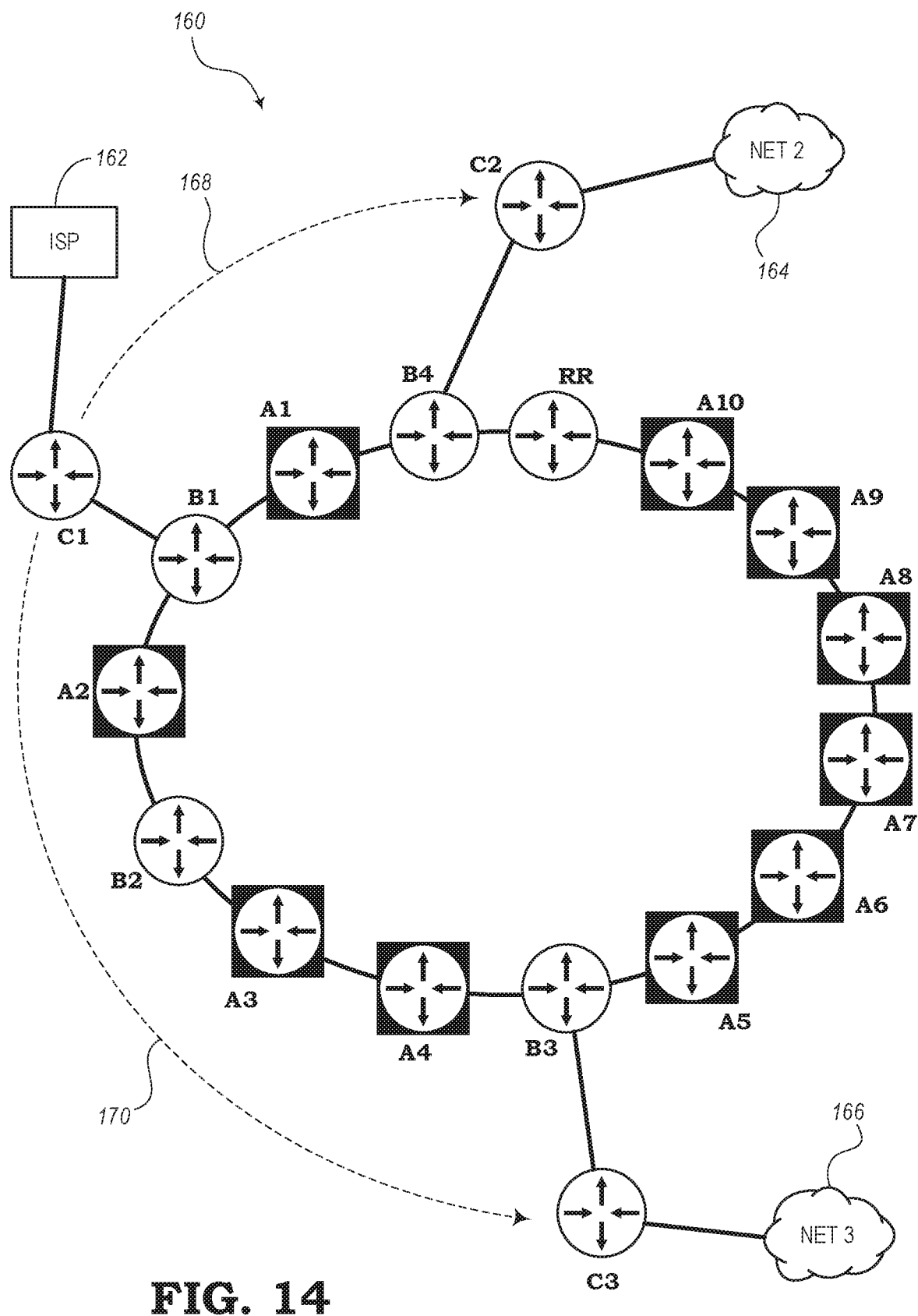
FIG. 14 is a diagram illustrating another AS having a plurality of nodes arranged with a ring topology for enabling SR and for providing two separate services, according to some embodiments.

FIG. 14 is a diagram illustrating another AS 160 having a plurality of nodes arranged within a ring topology for enabling SR and for providing two separate services. Thus, FIG. 14 represents another customer use-case scenario in which the systems and methods of the present disclosure may be implemented. In this embodiment, the nodes may be arranged in a ring such that each node includes two neighboring or adjacent nodes linked by SR tunnels. The nodes may include BGP nodes (e.g., B nodes), IGP nodes (e.g., A nodes), Route Reflector (RR) nodes, etc. The order of the nodes in this example going in a clockwise direction are arranged as B1-A1-B4-RR-A10-A9-A8-A7-A6-A5-B3-A4-A3-B2-A2-B1. Node B1 is connected to Internet service provider router C1; node B4 is connected to Internet gateway router C2; and node B3 is connected to Internet gateway router C3. Router C1 may include communication with an ISP 162; router C2 may include communication with a first network 164 (e.g., Internet-2) for providing a first Internet access service or other type of service; and router C3 may include communication with a second network 166 (e.g., Internet-3) for providing a second Internet access service or other type of service.

Router C1 may be configured to conduct one BGP session with the router C2 associated with the first network 164 and may be configured to conduct another BGP session with the router C3 associated with the second network 166. Routers C2 and C3 may have full Internet routing tables from the first and second networks 164, 166. The best path to take may be determined based on the BGP cost. Node B1 may have Virtual Local Area Networks (VLANs) connected to the ISP 162. The Transport Service Provider (SP) may be configured to offer L2-VPN service to its ISP customer. These VLANs may be carried over Ethernet Pseudo-Wire (PW), and the Ethernet PWs may be carried over SR transport. In this example, the ISP customer may request that when a fault is detected in the L2-VPN service offered by network 164, the fault may be handled locally by finding an alternative path to Internet sites via the router C3 associated with the second network 166.

In order to satisfy the client requirement, transport SP would create VCCV BFD for monitoring the PW between B1 and B4 and would set this TTL value to 2, since B1 and B4 are two hops away from each other in this example. As described above, the "transport" TTL of the "service" OAM frame (e.g., VCCV BFD) is inherited from the "service" TTL. When a fault occurs between B1 and B4 and TI-LFA takes the longer transport path, VCCV-BFD-inherited transport TTL will expire causing VCCV BFD to not be able to reach the PW destination. This will cause PW to go down, which in turn causes the B1-to-B4 BGP session to go down. In one example, node B1 may have VLAN-100 to reach network 164 via node B4 and VLAN-101 to reach network 166 via node B3. The PWs over SR configured on B1 ensure that PW carrying VLAN-100 transit via SR tunnels A1-to-B4 while PW for VLAN-101 transit through tunnels A2-to-B3 to reach network 166. The path to network 164 is the primary path and the path to network 166 is the standby (i.e., backup) path. There is also a BGP session for communication between node B1 and ISP router C1.

The present disclosure may use a strategy whereby the ISP router C1 can influence the path that needs to be taken and make its own decision. Whenever there is a fault in the SR primary path via A1 to reach network 164, a switchover can be made at router C1 to utilize the shorter standby path via nodes A2 through B3 to reach network 166 instead of an SR switchover via a longer IGP path (i.e., B1-A2-B2-A3-A4-B3-A5-A6-A7-A8-A9-A10-RR-B4) to reach network 164.

As shown in FIG. 14, C1 may be an ISP1 router and C2 and C3 may be Internet gateway routers. The nodes arranged in the ring include a connectivity with each other, such as tunnels. Routers C1, C2, C3 are connected with nodes B1, B4, B3, respectively. Arrow 168 indicates the selection of a path, whereby router C1 has selected C2 for communication with network 164. Arrow 170 indicates a second choice (e.g., backup or protection path) from router C1 to router C3. According to the embodiments described herein, a network may be set up where a condition for an Internet access service may include determining the primary and secondary paths. Thus, if Internet access is not available via router C2, for any reason, the network 160 may be configured to keep this Internet access service down. Instead, the network 160 can switch to Internet access through the alternative router C3. Thus, the path is routed instead from C1 to C3.

In this scenario, a Pseudo Wire (PW) is connected over a second router C3. If there is a failure between B1 and A1, or between A1 and B4, the IGP and SR would converge and the network 160 would initially plan to go along the longer path B1-A2-B2-A3-A4-B3-A5-A6-A7-A8-A9-A10-RR-B4 around the ring. Initially, this is considered to be the secondary path for the connectivity from C1 and C2, but in this situation it must go via a much longer path. Since latency is a consideration in the present disclosure, this longer alternative path defeats the purpose of minimizing latency when the shorter path From B1 to B4 is defective. Therefore, as mentioned in the present disclosure, the network 160 can keep the "service" down (e.g., the Internet access service through C2) and use an alternative service (e.g., an Internet access service associated with or available through a different network 166).

The routing process does not stop with respect to IGP and SR. SR converges when a fault is detected, and the conventional backup path is selected to restore the connectivity between C1 and C2. To stop this process, the systems and methods of the present disclosure use a different approach from the conventional protection path scheme. As discussed herein, the present embodiments utilize the TTL to stop the network 160 from attempting to restore the connection to a particular node associated with one particular service, when a closer node associated with the same or similar service can be reached along a much shorter path than the original protection path.

By setting the TTL to the number of hops needed to reach the shortest path (e.g., two hops in the example of FIG. 14), the TTL would expire much earlier than if the longer alternative path around the ring were attempted. When there is a break between B1 and B4 (e.g., along the B1-A1 link, along the A1-B4 link, and/or a fault at node A1), the restoration path in the opposite direction is attempted with a low TTL value (e.g., 2). When the packet goes from B1 to A2 (the first hop) and then from A2 to B2 (the second hop), the TTL will expire and the packet does not reach its destination. The PW stays down, according to the teachings of the present disclosure, and router C1 then uses a backup service and goes to router C3 instead of going back to router C2.

The network 160 is configured to make sure that the PW OAM continues to work properly, but with the break it does not force connectivity over the longer SR path. This process may be embedded in the OAM module 34 and re-routing module 36 of the service re-routing system 20 described with respect to FIG. 2.

The OAM message may originate at node B1, whereby the actions may operate independent of router C1. Router C1 may perform its own OAM monitoring to detect that router C2 has gone down. At this point, the node B1 can do a switchover to router C3. In a sense, the perceived failure of C2 (e.g., arising from the expiration of the TTL) can influence router C1 to select router C3 since the PW from C1 to C2 would be perceived as being down. When the PW is down, router C1 would not be able to reach C2 and would turn to a backup (or protection) service via C3. By giving the impression that the PW is down, the re-routing module 36 has done its part of influencing C1, so that another Internet gateway router C3 can be used.

The re-routing module 36 artificially establishes a low TTL to keep the C1-to-C2 service down. In this use-case, a network administrator may wish that the underlying service is not forced to go on a much longer path when a fault is detected. Setting the TTL low works well to force the network 160 to avoid longer backup paths and utilize shorter routes to alternative Internet routers.

The network 160 may operate using IGP as a transport for PW. The present disclosure operates on the transport layer and ensures that the layering aspects of the network 160 are not violated. Other traffic may exist within the network 160 and the SR paths may be created for other nodes or PWs. Multiple PWs may be used with different requirements. Communication along the longer path from node B1 to node B4 (i.e., in the illustrated counterclockwise direction) may be acceptable in many cases in order to provide resiliency of the transport layer. Even if the backup path is not many hops beyond the set TTL, the TTL automatically makes sure that even if there is any convergence, the PW for that session will be kept operationally down. However, for other PWs, that may not be the case and traffic may continue along the longer path for other sessions. The nodes can therefore intelligently select the TTL inheriting for certain OAMs, but not for all.

In other embodiments, however, the re-routing module 36 may be configured to affect the transport layer so as to initiate a commonly pushed down operation for all the PWs that are being used. This may be an additional enhancement to the embodiments of the present disclosure. The re-routing module 36 may be extended to affect multiple PWs using the same transport.

One of the benefits of the present disclosure is that the "service" attached to the affected service OAM is the only service that is affected. This is ensured by using the TTL exhaust in this particular "service" OAM frame to orchestrate a service OAM failure. However, if the network operator wants all the "services" utilizing the same SR tunnel to adhere to the same behavior, then the network operator may incorporate the same TTL exhaust scheme in the "transport" OAM frame as well. This will ensure that the "transport" SR tunnel will always remain operationally down thereby orchestrating a "service" layer switchover. The primary path caters to a particularly defined PW OAM, because some operators may wish to have it on a particular PW. However, in the case that multiple PWs are running over the same SR tunnel, the operator may want the commonality of switching over for all services.

Node B1 is configured so that it knows which PW to apply the TTL exhaust to. It sets the TTL for that PW on the corresponding OAM. One thing to note in this process is that the re-routing module 36 does not mess with any timers. Usually in other protection schemes, timers (e.g., OAM timers, forward protection timers, etc.) may be altered to achieve a desired behavior. However, by messing the timer, a system might be compromising other things in the network. For instance, this type of control may result in an abandonment of commonality. Also, the industry standard does not normally mess with timers, which is a layering violation. Instead, the systems and methods of the present disclosure use a clean solution. Instead of changing any timers to cause the network 160 to operate in an abnormal manner, the timers are left alone so that other modules may use these same timers as well.

The idea of using TTL to prevent recovery of a service via an IGP-computed longer path over an SR tunnel is not performed in conventional systems. Again, the TTL can be based on the Maximum Primary Hop count to force an early failure on the service layer. As such, the idea of effecting the change at the "service" layer as opposed to "transport" Layer is not typically done in conventional systems. Also, the idea of addressing the problem using TTL in a service OAM packet encapsulated with MPLS is novel.

Inducting Service OAM TTL to transport MPLS label TTL uniquely caters to path stickiness of a given service and not affect other services that is also using the same MPLS transport tunnel and does not share the same constraints. The idea of applying the same scheme at "transport" OAM to effect a "service" switchover for multiple "services" is also novel (Future Enhancement). The idea of copying the TTL frame from PW Header to the outermost MPLS header to effect a packet drop is not normally performed by conventional systems.

One of the benefits of using the systems and methods of the present disclosure is that the present embodiments can meet key customer deployment use-cases. Also, the present embodiments may provide more control to the routers within a network. Furthermore, the present embodiments can leave the architecting of proposed paths to a network operator, according to other embodiments.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising
a processing device, and
a memory device configured to store software logic including instructions that, when executed, enable the processing device to
determine there is a defect in a primary Segment Routing (SR) path to a main destination,
identify an available path to an alternative destination that is shorter than a backup SR path to the main destination,
switch a main service associated with the main destination over to an alternative service associated with the alternative destination based on the determined defect and the identified available path, and
cause a switch of the main service over to the alternative service by purposefully causing the backup SR path on a transport layer to fail, thereby forcing a service switchover on a service layer to the alternative service associated with the alternative destination, wherein the backup SR path is failed by setting a Time-to-Live (TTL) parameter for the backup SR path to a value that would prevent recovery on the backup SR path.

2. The system of claim 1, wherein the transport layer is a Multi-Protocol Label Switching (MPLS) layer and the service layer is a Border Gateway Protocol (BGP) layer.

3. The system of claim 1, wherein the primary SR path extends from a service initiating node to the main destination and the backup SR path also extends from the service initiating node to the main destination, wherein the path to the alternative destination is a backup service path extending from the service initiating node to the alternative destination, and wherein the main destination is configured as a first Border Gateway Protocol (BGP) node and the alternative destination is configured as a second BGP node.

4. The system of claim 3, wherein the backup service path is a recovery path including Interior Gateway Protocol (IGP)-based SR tunnels.

5. The system of claim 1, wherein the step of setting the TTL parameter includes the step of setting the TTL parameter to a value equal to the maximum number of hops from a source node to a destination node associated with the main destination along the primary SR path.

6. The system of claim 1, wherein the step of switching over to the alternative service includes the steps
decrementing the TTL after each hop along the backup SR path; and
detecting when the TTL on the backup SR path expires.

7. The system of claim 1, wherein the instructions further enable the processing device to copy the TTL parameter from a Pseudo-Wire (PW) header to an outermost Multi-Protocol Label Switching (MPLS) header to effect a packet drop.

8. A system comprising
a processing device, and
a memory device configured to store software logic including instructions that, when executed, enable the processing device to
determine there is a defect in a primary Segment Routing (SR) path to a main destination,
identify an available path to an alternative destination that is shorter than a backup SR path to the main destination,
switch a main service associated with the main destination over to an alternative service associated with the alternative destination based on the determined defect and the identified available path, and
cause a switch of the main service over to the alternative service by purposefully causing the backup SR path on a transport layer to fail, thereby forcing a service switchover on a service layer to the alternative service associated with the alternative destination,
wherein the transport layer is a Multi-Protocol Label Switching (MPLS) layer and the service layer is a Border Gateway Protocol (BGP) layer.

9. The system of claim 8, wherein the instructions further enable the processing device to purposefully cause the backup SR path to fail by setting a Time-to-Live (TTL) parameter for the backup SR path to a value that would prevent recovery on the backup SR path.

10. The system of claim 8, wherein the primary SR path extends from a service initiating node to the main destination and the backup SR path also extends from the service initiating node to the main destination, wherein the path to the alternative destination is a backup service path extending from the service initiating node to the alternative destination, and wherein the main destination is configured as a first Border Gateway Protocol (BGP) node and the alternative destination is configured as a second BGP node.

11. The system of claim 10, wherein the backup service path is a recovery path including Interior Gateway Protocol (IGP)-based SR tunnels.

12. The system of claim 9, wherein the step of setting the TTL parameter includes the step of setting the TTL parameter to a value equal to the maximum number of hops from a source node to a destination node associated with the main destination along the primary SR path.

13. The system of claim 9, wherein the step of switching over to the alternative service includes the steps
   decrementing the TTL after each hop along the backup SR path; and
   detecting when the TTL on the backup SR path expires.

14. The system of claim 9, wherein the instructions further enable the processing device to copy the TTL parameter from a Pseudo-Wire (PW) header to an outermost Multi-Protocol Label Switching (MPLS) header to effect a packet drop.

15. A system comprising
   a processing device, and
   a memory device configured to store software logic including instructions that, when executed, enable the processing device to
      determine there is a defect in a primary Segment Routing (SR) path to a main destination,
      identify an available path to an alternative destination that is shorter than a backup SR path to the main destination, and
      switch a main service associated with the main destination over to an alternative service associated with the alternative destination based on the determined defect and the identified available path,
   wherein the primary SR path extends from a service initiating node to the main destination and the backup SR path also extends from the service initiating node to the main destination, wherein the path to the alternative destination is a backup service path extending from the service initiating node to the alternative destination, and wherein the main destination is configured as a first Border Gateway Protocol (BGP) node and the alternative destination is configured as a second BGP node.

16. The system of claim 15, wherein the instructions further enable the processing device to cause a switch of the main service over to the alternative service by purposefully causing the backup SR path on a transport layer to fail, thereby forcing a service switchover on a service layer to the alternative service associated with the alternative destination.

17. The system of claim 16, wherein the transport layer is a Multi-Protocol Label Switching (MPLS) layer and the service layer is a Border Gateway Protocol (BGP) layer.

18. The system of claim 16, wherein the instructions further enable the processing device to purposefully cause the backup SR path to fail by setting a Time-to-Live (TTL) parameter for the backup SR path to a value that would prevent recovery on the backup SR path.

19. The system of claim 16, wherein the backup service path is a recovery path including Interior Gateway Protocol (IGP)-based SR tunnels.

20. The system of claim 18, wherein the step of setting the TTL parameter includes the step of setting the TTL parameter to a value equal to the maximum number of hops from a source node to a destination node associated with the main destination along the primary SR path.

* * * * *